US006957122B2

(12) United States Patent
Dütsch et al.

(10) Patent No.: US 6,957,122 B2
(45) Date of Patent: Oct. 18, 2005

(54) METHOD FOR GENERATING AND VISUALIZING A TASK-ORIENTED STEP REPRESENTATION

(75) Inventors: Matthias Dütsch, Möglingen (DE); Klaus Hertinger, Erlangen (DE); Timo Pallas, Stuttgart (DE); Martin Seithe, Erlangen (DE); Winfried Wacker, Höchstadt (DE)

(73) Assignee: Siemens Aktiengesellschaft, München (DE)

( * ) Notice: Subject to any disclaimer, the term of this patent is extended or adjusted under 35 U.S.C. 154(b) by 12 days.

(21) Appl. No.: 10/789,409

(22) Filed: Feb. 27, 2004

(65) Prior Publication Data

US 2004/0215364 A1 Oct. 28, 2004

(30) Foreign Application Priority Data

Feb. 27, 2003 (DE) ........................................ 103 08 815

(51) Int. Cl.[7] ........................... G06F 19/00; G06F 9/44; G06F 9/45

(52) U.S. Cl. ....................... 700/180; 717/123; 717/125; 717/132; 717/142

(58) Field of Search ................................ 700/180–182; 717/123, 132, 142, 125

(56) References Cited

U.S. PATENT DOCUMENTS 4,860,203 A * 8/1989 Corrigan et al. ............ 717/123
5,446,911 A * 8/1995 Juso et al. .................. 717/123
5,452,206 A * 9/1995 Turrietta et al. ............ 715/531
5,678,052 A * 10/1997 Brisson ......................... 704/4
6,507,855 B1 * 1/2003 Stern .......................... 715/513
2002/0046397 A1 * 4/2002 Schmitt et al. ............. 717/125

FOREIGN PATENT DOCUMENTS

| | | | |
|---|---|---|---|
| DE | 39 01 838 | A1 | 8/1990 |
| DE | 43 25 691 | A1 | 2/1995 |
| DE | 690 30 318 | T2 | 10/1997 |
| DE | 100 38 441 | A1 | 10/2002 |

* cited by examiner

*Primary Examiner*—Albert W. Paladini
*Assistant Examiner*—Ryan Jarrett
(74) *Attorney, Agent, or Firm*—Henry M. Feiereisen

(57) ABSTRACT

A method for generating and visualizing a task-oriented step representation of one or more parts programs in machine tools or production machines is described. A syntax analyzer searches the parts program for key terms, whereafter a task-oriented step representation of the parts program(s) is generated based on the key terms found in the search. The task-oriented step representation can then be visualized to a user. The disclosed method can advantageously be used to visualize and display parts programs of machine tools or production machines, which are available in ASCII code, in form of a step representation or step diagram without necessitating changes in the parts programs.

8 Claims, 4 Drawing Sheets

METHOD FOR GENERATING AND VISUALIZING A TASK-ORIENTED STEP REPRESENTATION

CROSS-REFERENCES TO RELATED APPLICATIONS

This application claims the priority of German Patent Application, Ser. No. 103 08 815.6, filed Feb. 27, 2003, pursuant to 35 U.S.C. 119(a)–(d), the disclosure of which is incorporated herein by reference.

BACKGROUND OF THE INVENTION

The present invention relates to a method for generating and visualizing a task-oriented step representation of at least one parts program in machine tools or production machines. In the context of this application, the term "production machine" is used in a generic sense and also includes robots which generally follow the concepts outlined here.

When a workpiece is machined with a machine tool or production machine, wherein production machines also include robots, axles and/or spindles can be moved during the production process. The axles and/or spindles which here describe a relative movement between a tool and a workpiece, are referred to as so-called machining units. In the production process, the axles and/or spindles are assigned to a so-called channel. The move instructions to be transmitted to the machining unit are defined and described in the channel in the form of a parts program. The parts program is transmitted inside a numerical controller of the machine to an interpreter which converts the parts program to a corresponding machine code.

For increasing the productivity, machine tools or production machines frequently include several machining units which can be moved simultaneously. These machine tools or production machines are referred to as multi-channel machines and can include several independent parts programs defining a number of relative movements between workpiece(s) and tool(s) that are simultaneously interpreted and executed by multiple channels, thereby allowing simultaneous machining of one or more of the workpieces. Each channel can have a dedicated parts program.

The parts program typically consists of a standard ASCII source code in conformance with DIN 66025/ISO as well as optional additional manufacturer-specific or machine-specific expansions and/or upgrades. The parts programs are typically displayed and processed in ASCII format using an editor, in particular a text editor. Also known are programming systems for programming the machine or generating parts programs, whereby the programming systems can be used to generate specific task-oriented parts programs in a so-called task-oriented step diagram which can be graphically displayed to the user. A step representation provides a structured view and structured processing of the various parts programs which facilitates programming and operating the machine. To date, only programs that were generated by a programming system that supports the representation of steps could be visualized in a step representation or as steps. Existing parts program could not be later processed using a step representation. In particular at the machine location, an operator was only able to use a genuine text editor to visualize and process the parts program.

It would therefore be desirable and advantageous to provide a simple method for generating and visualizing a task-oriented step representation of one or more parts programs in machine tools or production machines.

SUMMARY OF THE INVENTION

According to one aspect of the present invention, a method for generating and visualizing a task-oriented step representation of at least one parts program in machine tools or production machines includes the steps of searching the parts program using a syntax analyzer for key terms, generating the task-oriented step representation of the parts program(s) based on the key terms found in the search, and visualizing the task-oriented step representation to a user.

According to one advantageous feature of the invention, the key terms can include fixed, i.e., unchangeable instructions, which can be synchronization instructions and/or user cycle instructions and/or syntax segments of the synchronization and user cycle instructions, and a combination thereof. By using fixed instructions or syntax segments of the instructions as key terms, the step representation of the parts program can be generated in a particular reliable and secure manner.

According to another advantageous feature of the invention, the key terms and an association between the key terms and the task-oriented steps can be stored in a configuration file that can be changed by the user and read by the syntax analyzer. In particular, a configurable configuration file allows a flexible selection of key terms adapted to the respective manufacturer of a machine and the machine itself. This is particularly advantageous since the programming language used by the machine manufacturers and based on standard ASCII-source code according to DIN 66025/ISO is frequently updated.

According to another advantageous feature of the invention, a corresponding identification of the task-oriented steps can be stored in the configuration file. This allows simple changes in the terminology of the steps.

According to yet another advantageous feature of the invention, the task-oriented step representation can be visualized with an editor. Visualization with an editor is particularly advantageous since the user can use the editor following visualization to directly edit the generated step representation or the original representation in ASCII-source code.

Advantageously, the editor can simultaneously visualize two or more parts programs as a step representation of the task-oriented steps and/or in ASCII source code. This approach allows the editor to optionally process several parts programs simultaneously.

According to another feature of the invention, the task-oriented step representation can be visualized as a normalized and/or a synchronized step representation. A normalized and/or synchronized step representation allows a representation of the individual steps or the production process which is particularly easy to understand.

According to another advantageous feature of the invention, individually performed tasks in the task-oriented step representation can be graphically displayed by step-specific symbols associated with a step. A graphic representation of the steps by symbols allows a particularly simple and clear visualization of the steps and a very fast recognition of the step type by the user.

According to another advantageous feature of the invention, the parts program can also include configuration instructions for combining several steps to a higher-level step or to a hierarchical plane. This enables the construction of hierarchical step structures.

According to yet another advantageous feature of the invention, the parts program can further include configuration instructions for storing step identifiers, symbols or hierarchical planes directly in the parts program. In this way, individual step identifiers and symbols tailored for the respective parts program can be defined independent of the configuration file.

According to yet another advantageous feature of the invention, the parts program can also include a definition file for causing the editor to highlight defined instructions and/or key terms. In this way, manufacturer-specific instructions according to DIN code and comments can be displayed to the user in different ways. This allows the user to more easily recognize and understand the instructions and/or key terms.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
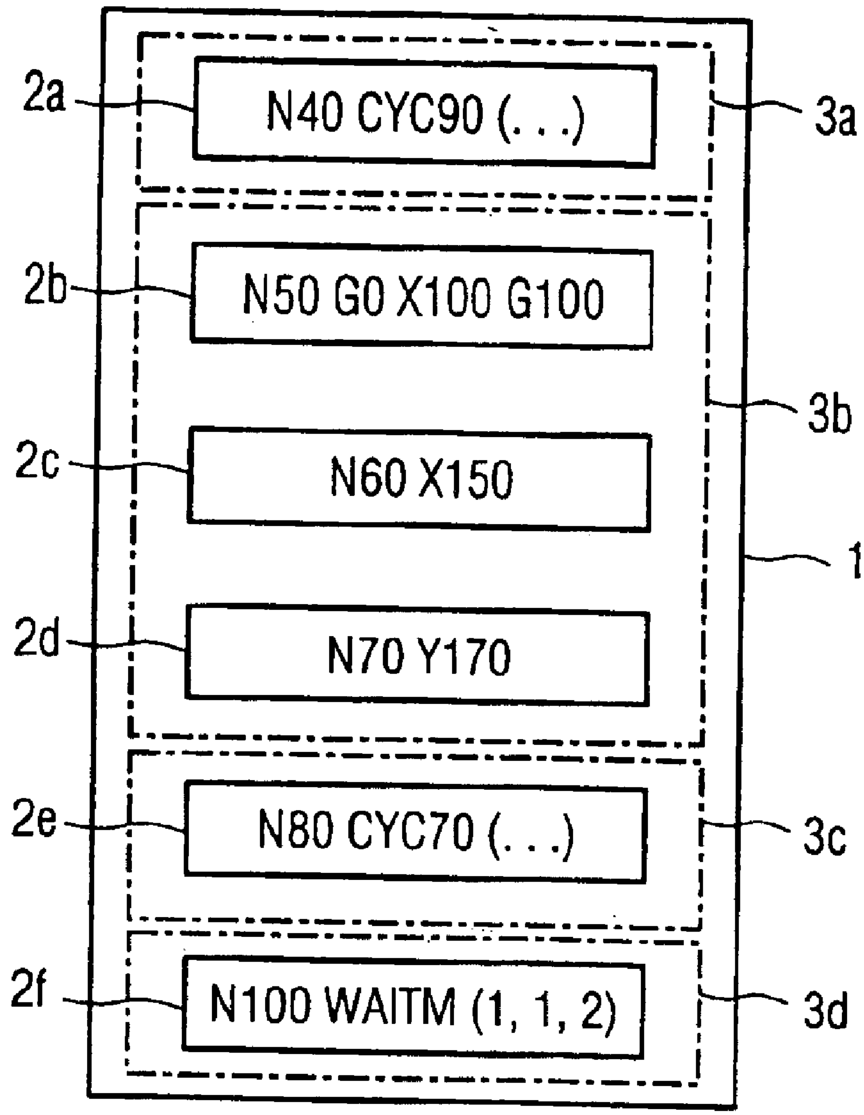
FIG. 1 shows a schematic block diagram of a parts program.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "ICONS AND ICON REPRESENTATION OF PROCESS STEPS FOR GRAPHIC VISUALIZATION OF TASK-ORIENTED STEPS".

Turning now to the drawing, and in particular to FIG. 1, there is shown a schematic block diagram of a parts program 1. The parts program 1 can include a large number of instructions, of which only exemplary instructions 2*a*, 2*b*, 2*c*, 2*d*, 2*e* and 2*f* are shown in form of functional blocks for sake of clarity. The individual instructions 2*a*, 2*b*, 2*c*, 2*d*, 2*e* and 2*f* are hereby written in the form of an ASCII source code conforming to DIN 66025/ISO. In addition, other manufacturer-specific and/or machine-specific instructions can exist in the form of ASCII source code. The embodiment of FIG. 1 shows an exemplary instruction 2*b*

| | | | |
|---|---|---|---|
| N50 | G0 | X100 | Y100 |

which indicates that the x-axis and the y-axis of the machine with the tool are to move rapidly to the position 100,100. The exemplary instruction 2*c* states, for example,

| | |
|---|---|
| N60 | X150 |

which indicates that the x-axis is to be moved to the position 150. Because a parts program can include a large number of instructions and in multi-channel machines several parts programs frequently have to be coordinated with each other, it is desirable and necessary to provide the user a representation of the parts program in the form of the so-called task-oriented step representation which can be more easily understood by the user.

Figure 2:
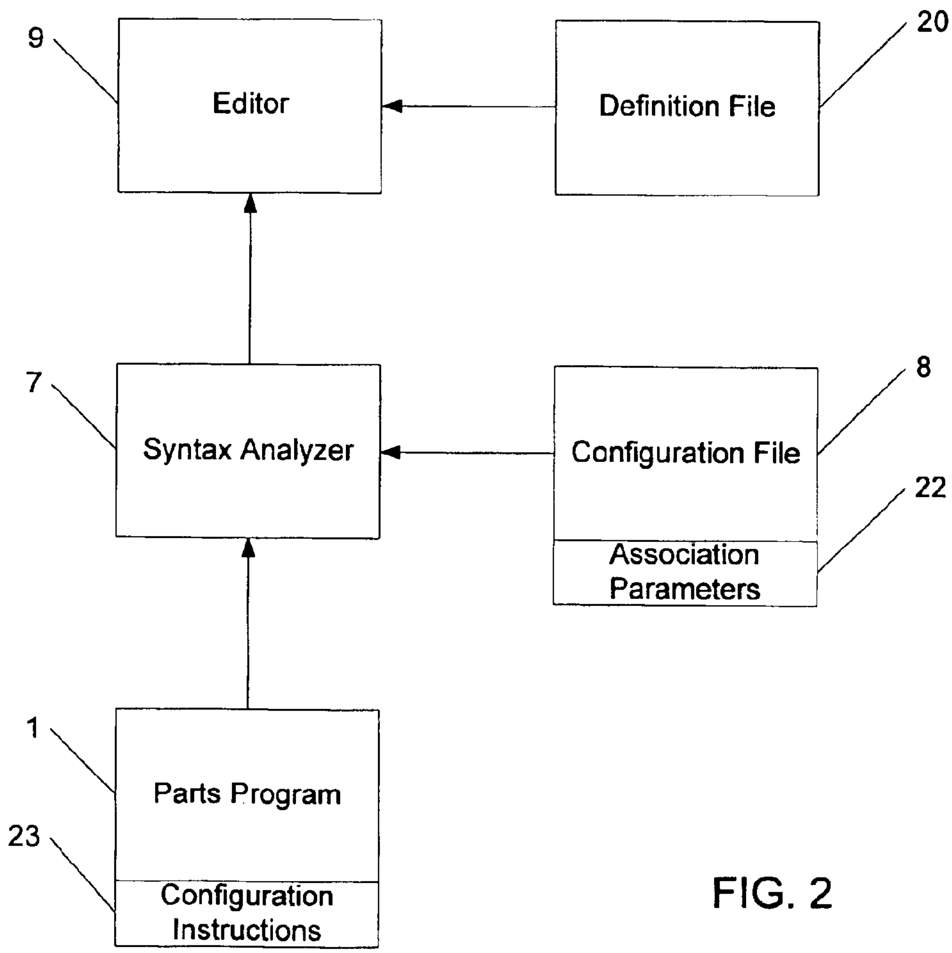
FIG. 2 shows a high-level block diagram of the process of the invention.

FIG. 2 shows the method of the invention in the form of a functional block diagram. First, a syntax analyzer 7 searches the parts program 1 for key terms. Based on found key terms, a task-oriented step representation of the parts program 1 is generated and visualized by the user with the help of an editor 9. A configuration file 8, which is read by the syntax analyzer 7, contains information about the step(s) to be associated with the respective key terms. A key term can be a part of an instruction, but can also be a complete instruction of the parts program 1. In addition, the configuration file 8 contains optional information about the type of the symbol that is associated with the respective key term or the respective step. The configuration file 8 can be changed and/or configured by the user according to the existing requirements and needs.

Figure 3:
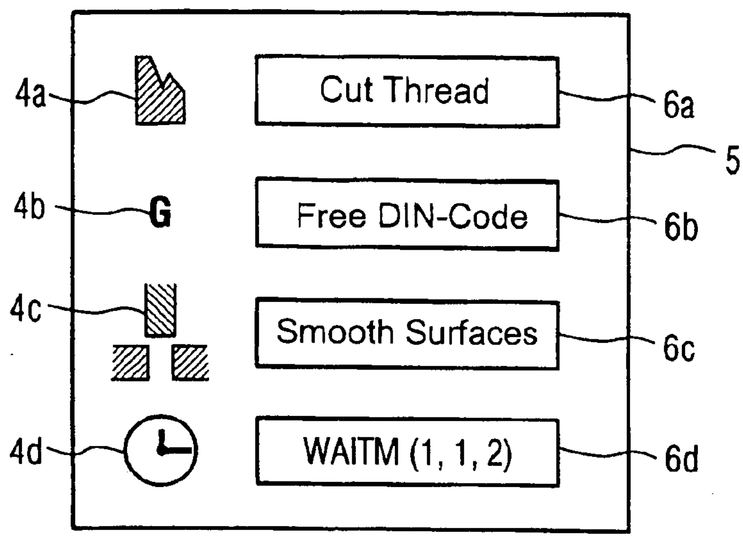
FIG. 3 shows a step representation of the parts program of FIG. 1.

FIG. 3 shows schematically an exemplary task-oriented step representation 5, as visualized, for example, to a machine user, on for example a monitor. FIG. 3 shows four exemplary steps 6*a*, 6*b*, 6*c* and 6*d*. The step 6*a* his herein designated as "Cut Thread", the step 6*b* is designated as "free DIN code", the step 6*c* is designated as "Smooth Surfaces", and the step 6*d* is designated as "WAITM (1,1, 2)". In addition, the step 6*a* is graphically depicted by a symbol 4*a*. Likewise, each of the steps 6*b*, 6*c* and 6*d* is also graphically depicted by a corresponding symbol 3*b*, 3*c* and 3*d*. It should be understood that the symbols shown in the step representation are optional.

At the start of the method, the syntax analyzer 7 searches the parts program 1 for key terms. In the illustrated embodiment, the key terms CYC90, CYC70 and WAITM are defined, wherein the key term CYC90 is associated with the step 6*a* and the symbol 4*a*. Likewise, the key term CYC70 is associated with the step 6*c* and the symbol 4*c*, and the key term WAITM is associated with the step 6*d* and the symbol 4*d*.

In the parts program of FIG. 1, the instruction 2*a* is [N40 CYC90 ( . . . )], the instruction 2*e* is [N80 CYC70 ( . . . )], and the instruction 2*f* is [N100 WAITM (1,1,2)]. Additional attributes, such as the attributes indicated in parentheses by dots, can be supplied.

If the syntax analyzer 7 of FIG. 2 encounters the key term CYC90 in the instruction 2*a*, then it generates in the step representation 5 the step 6*a*, with the designation "Cut Thread", and the corresponding symbol 4*a*. The syntax analyzer 7 then further searches the parts program 1 until it finds another key term. The instructions 2*b*, 2*c*, 2*d* in the illustrated embodiment do not contain a key term and are located between the two key terms CYC90 and CYC70. Accordingly, these instructions are combined by the syntax analyzer 7 to a step 6*b* designated as "free DIN code", and the associated symbol 4*b* is generated. Both the identifier and the symbol are defined in the configuration file 8. In the depicted embodiment, the syntax analyzer 7 finds the next key term CYC70 in the instruction 2*e* [N80 CYC70( . . . )]. Since the key term CYC70 in the embodiment is connected in the configuration file 8 with the step 6*c* designated as "Smooth Surfaces", the syntax analyzer 7 in the step representation 5 generates the step 6*c* with the designation "Smooth Surfaces", as well as the associated symbol 4*c*. The syntax analyzer 7 then searches again the parts program 1 according to FIG. 1 until it finds the next key term which in the depicted embodiment is represented by the key term WAITM. According to the association in the configuration file 8, a corresponding step 6*d* with the designation WAITM (1,1,2) is generated, as well as a corresponding symbol. This represents a special case, since the key term is substantially identical with the designation of the step 6*d*.

In this way, closely related instructions are combined into a single step. The instruction associated with step 6*a* (Cut Thread) in FIG. 3 is enclosed in FIG. 1 by a dotted line and has the reference character 3*a*. The instructions associated with step 6*b* (free DIN code) are given the reference character 3*b* in FIG. 1. The instruction associated with the step 6*c* (Smooth Surfaces) in FIG. 1 has the reference character 3*c*. The instruction associated with the step 6*d* is also in FIG. 1 by a dotted line and provided with the reference character 3*d*. Accordingly, the method of the invention generates from the confusing parts program 1 a structured step representation 5 that can be easily understood by a user and visualized with the editor 9.

It should be mentioned here that in addition to the key terms used in the depicted embodiment, other key terms can be used that can have different effects on the syntax analyzer 7. For example, special key terms can be employed that can cause the syntax analyzer 7 to combine all intermediate instructions into a single step, until the next key term is found and to designate the step according to the special key term and/or to generate a suitable symbol.

As already mentioned at the beginning, in multi-channel machines a dedicated parts program can be associated with each channel. A user can use a corresponding selection menu in these machines to cause the syntax analyzer to convert several parts programs into a single step representation and optionally visualize the step representation on the editor 9. For example, by simultaneously visualizing two parts programs with the editor, the execution of the programs can be compared with each other. The editor 9 provides a so-called normalized step representation and a so-called synchronized step representation for a visualization purposes. In the normalized step representation, the individual steps are sequentially displayed on the monitor.

Figure 4:
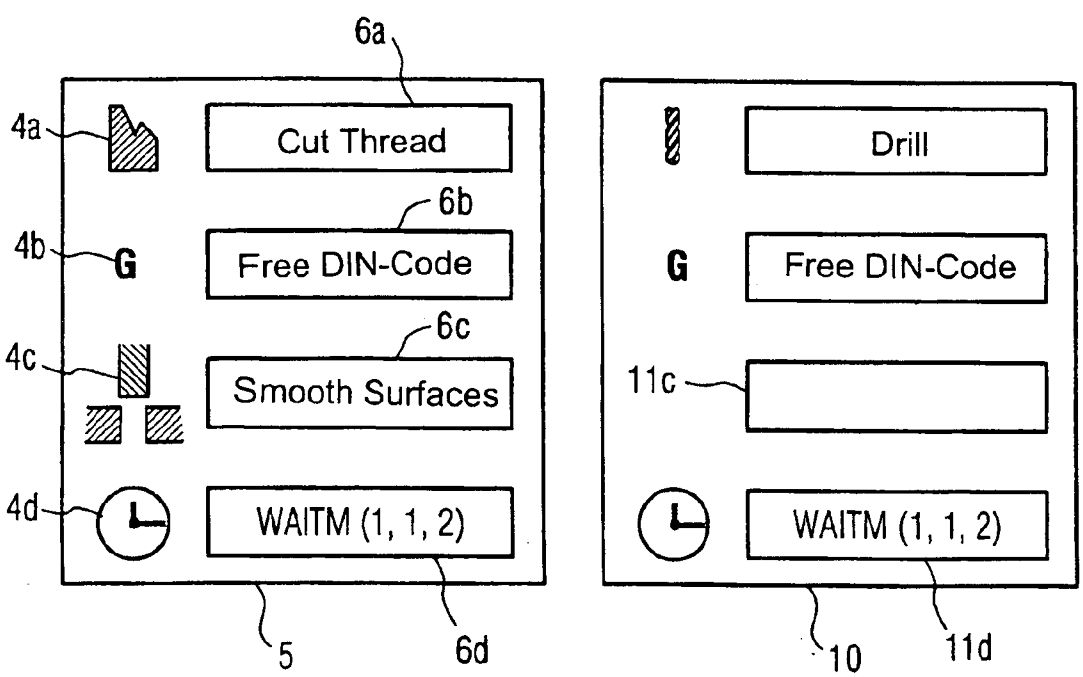
FIG. 4 shows a synchronized step representation of two parts programs.

In the synchronized step representation, which is depicted in FIG. 4, the two step representations 5 and 10 of two different parts programs are displayed next to each other so that special steps, such as the steps indicating synchronization between the two parts programs and/or coordination instructions, are displayed in the same row.

Such specific synchronization steps are, for example, the step 6*d* [WAITM(1,1,2)] and the step 11*d* [WAITM(1,1,2)] in FIG. 4. In the embodiment depicted in FIG. 4, the step representation 5 of a first parts program 1 is displayed next to the step representation 10 of a second parts program. In this embodiment, the execution of the second parts program is stopped when reaching the step 11*d* [WAITM(1,1,2)] for synchronizing the two parts programs, until the parts program 1 depicted in the step representation 5 has reached the step 6*d*. The two parts programs are from here on processed together. If in the step representation the first parts program has more steps than the second parts program between two special steps associated with the synchronization and/or coordination of parts programs, then corresponding empty steps are inserted into the parts program with the lesser number of steps in the step representation, as indicated by the empty step 11*d* in FIG. 4. For the sake of clarity, the synchronization and/or coordination step before "Cut Thread" or "Drill" is not shown in FIG. 4.

Suitable key terms are particularly the aforementioned synchronization instructions or associated syntax segments, such as WAITM and/or user cycle instructions, i.e., jumps to sub-programs such as the instruction segment CYC as well as special coordination instruction segments, such as GET/RELEASE of commonly used resources (e.g., exchange of axes in the channels). The synchronization instruction WAITM represents, for example, an instruction for program coordination of parts programs that affects the program execution of the parts programs. The configuration file, which can be freely configured by the user, is capable of writing any syntax sequences or parts of instructions or entire instructions into the configuration file 8, where they can be associated with freely selectable designations of the associated steps and the associated symbols and the desired plane.

Using the editor 9, a corresponding parts program can be directly loaded and represented in ASCII code. Alternatively or in addition, the editor can also be used to directly write instructions in ASCII source code into the parts program or to change the ASCII code of the parts program. For example, special instructions, so-called configuration instructions 23 (see FIG. 2), that are not already present in the parts program 1 can be written later to the parts program. Such configuration instruction 23 contains in addition to the actual key term information about the designation of the steps generated by the syntax analyzer from the key term, and optionally a definition of the associated symbol as well as a definition of the desired hierarchical plane. The step designations, symbols and planes can then be directly stored in the parts program independent of the configuration file.

Figure 5:
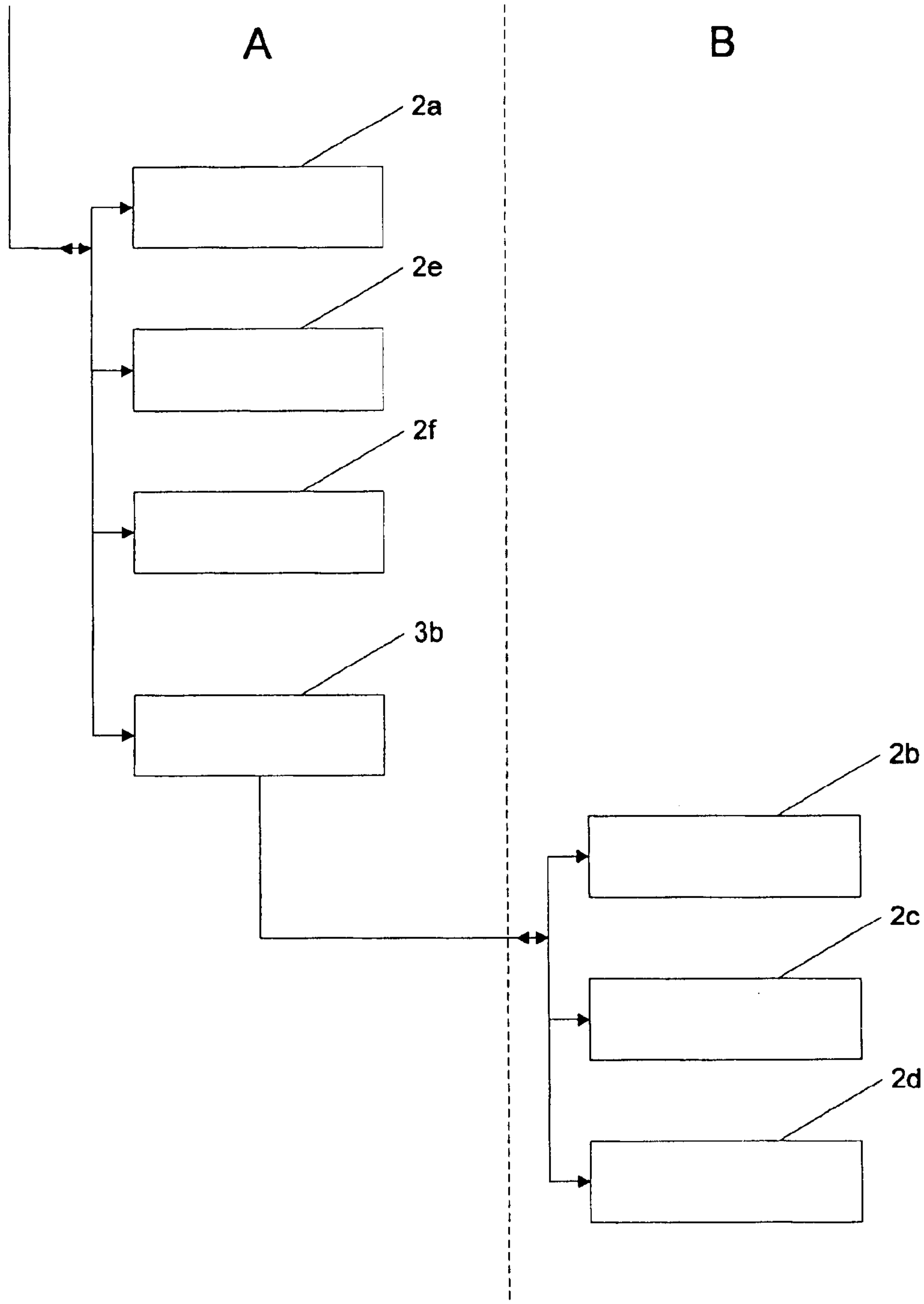
FIG. 5 shows hierarchical step structures in a collapsed and in an expanded view.

The editor 9 can also be used to combine several steps into a higher-level step with the help of the configuration instructions 23 and to thereby build hierarchical step structures depicted in FIG. 5. The steps can be displayed as an exploded view B in FIG. 5, showing all the steps, or as an imploded view A whereby only the steps of, for example, a first hierarchical plane are shown.

Of course, the editor can also display, in addition to the aforedescribed synchronized step representation, a synchronized representation of the parts program in ASCII source code.

With the help of a so-called definition file 20 (see FIG. 2) which can supply the editor 9 with information about particular key terms and instructions, certain defined key terms and/or instructions can be highlighted in the editor 9, in particular color-coded. In this way, for example, manufacturer-specific instructions and instructions conforming with the DIN code can be displayed to the user in different form.

So-called association parameters 22 (see FIG. 2) can be used to combine several steps associated with each key term in the configuration file 8 to a higher-level step or plane (see FIG. 1 and 5).

The method according to the invention can advantageously be used to visualize and display parts programs of machine tools or production machines, which are available in ASCII code, as a step representation or step diagram without necessitating changes in the parts programs.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for generating and visualizing a task-oriented step representation of at least one parts program in machine tools or production machines, comprising the steps of:

searching the parts program using a syntax analyzer for key terms that include synchronization instructions;

generating the task-oriented step representation of the at least one parts program based on the key terms found in the search;

storing the key terms and an association between the key terms and the task-oriented steps in a configuration file that can be changed by the user and read by the syntax analyzer; and visualizing the task-oriented step representation as a synchronized step representation by displaying simultaneously at least two different parts programs side-by-side as a step representation, so that steps that indicate a synchronization between the two parts programs are displayed in a common row.

2. The method of claim 1, wherein the visualization is performed by an editor.

3. The method of claim 1, wherein individually performed tasks in the task-oriented step representation are graphically displayed by step-specific symbols associated with a step.

4. The method of claim 1, wherein the parts program further comprises configuration instructions for combining several steps to a higher-level step or to a hierarchical plane.

5. The method of claim 1, wherein the configuration file further comprises an association parameter for combining several steps to a higher-level step or to a hierarchical plane.

6. The method of claim 1, wherein the parts program further includes configuration instructions for storing step identifiers, symbols or hierarchical planes directly in the parts program.

7. The method of claim 1, wherein the parts program further includes configuration instructions for storing step identifiers, symbols or hierarchical planes directly in the parts program independently of the configuration file.

8. The method of claim 2, wherein the parts program further includes a definition file for causing the editor to highlight defined instructions or key terms, or both.

* * * * *